C. L. TOMLINSON.
MOVING PICTURE MACHINE.
APPLICATION FILED MAY 3, 1916.
1,265,715.
Patented May 7, 1918.
3 SHEETS—SHEET 3.
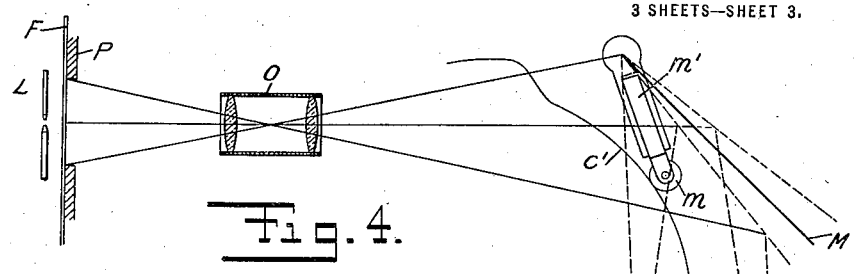
Fig. 4.
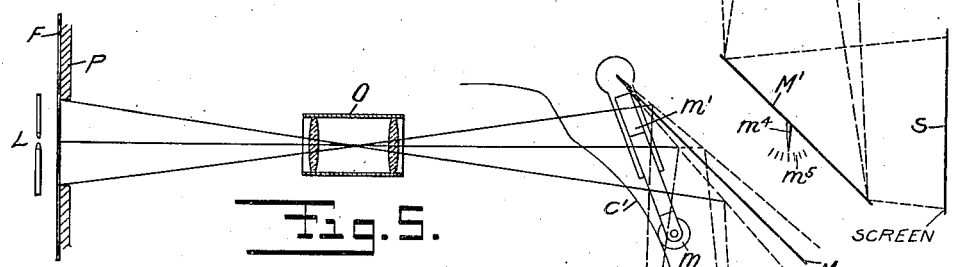
Fig. 5.
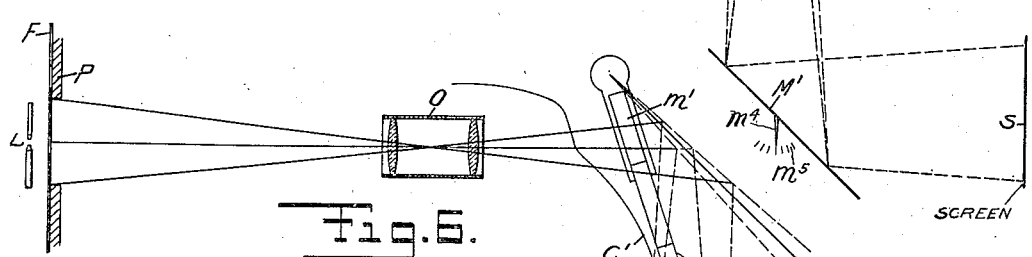
Fig. 6.
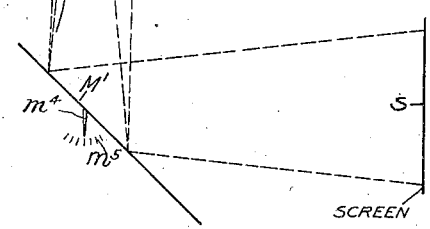

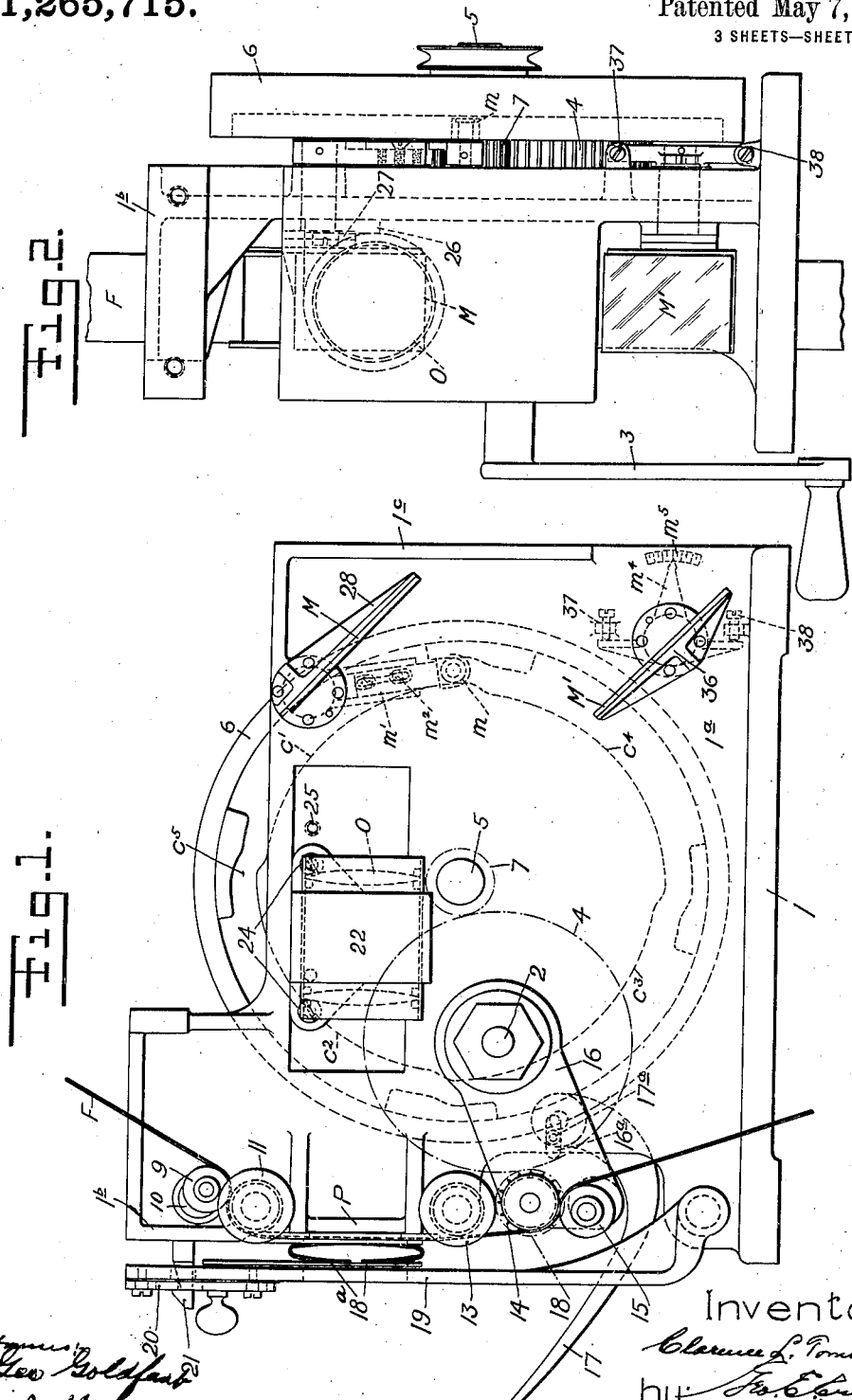
C. L. TOMLINSON.
MOVING PICTURE MACHINE.
APPLICATION FILED MAY 3, 1916.
1,265,715.
Patented May 7, 1918.
3 SHEETS—SHEET 1.

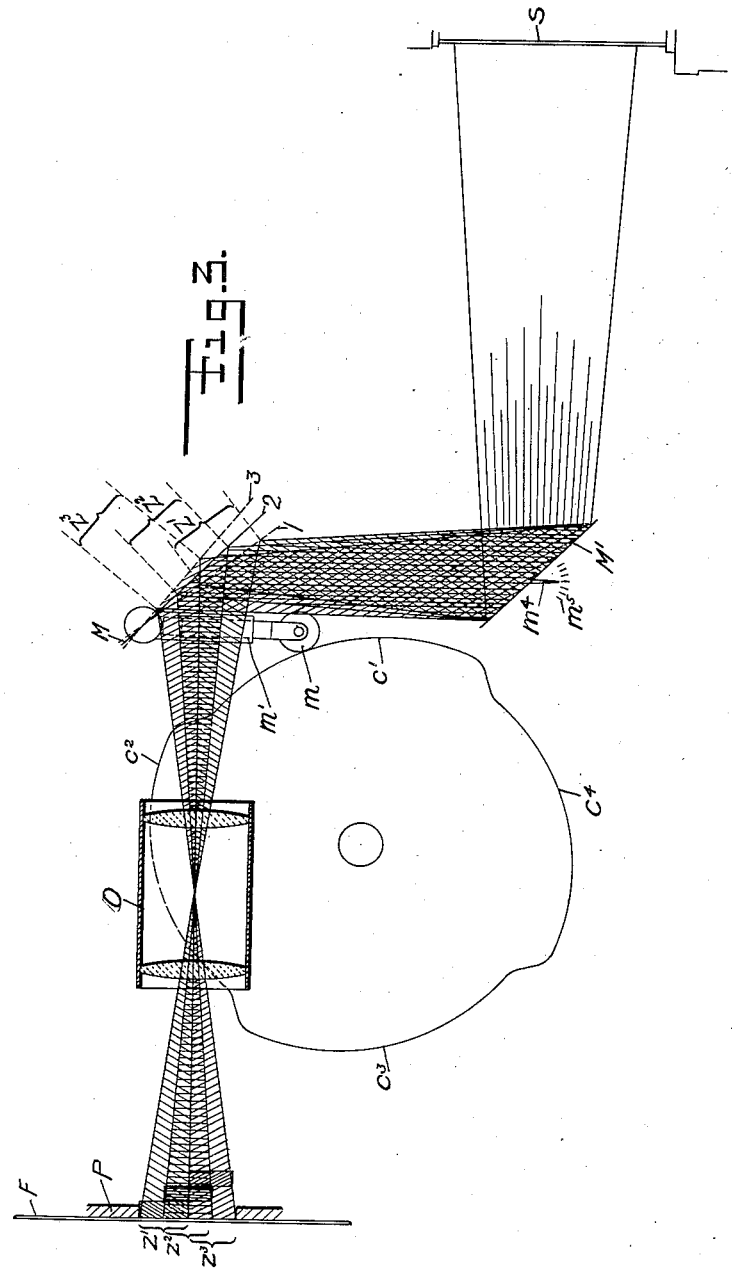

UNITED STATES PATENT OFFICE.

CLARENCE L. TOMLINSON, OF NEW YORK, N. Y., ASSIGNOR TO GEORGE REYNOLDS, OF LOS ANGELES, CALIFORNIA.

MOVING-PICTURE MACHINE.

1,265,715.  Specification of Letters Patent.  Patented May 7, 1918.

Application filed May 3, 1916. Serial No. 95,018.

*To all whom it may concern:*

Be it known that I, CLARENCE L. TOMLINSON, a citizen of the United States, residing in the borough of Manhattan, city, county, and State of New York, have invented certain new and useful Improvements in Moving-Picture Machines, of which the following is a specification.

My invention relates to moving picture machines, and particularly to moving picture machines which employ a plurality of mirrors in the projection of the pictures onto a screen. I will describe a moving picture machine embodying my invention and then point out the novel features thereof in claims.

In the accompanying drawings, Figure 1 is a side elevation of a moving picture machine showing one embodiment of my invention. Fig. 2 is an elevation of that end of the machine shown in Fig. 1 from which the pictures are projected onto a screen. Fig. 3 is a diagrammatic view of a moving picture machine embodying my invention. Figs. 4, 5 and 6 are each views similar to Fig. 3 and each embodying my invention. Figs. 4, 5 and 6 show objective lenses having different focal distances. Similar letters of reference designate corresponding parts in all of the figures.

Referring more particularly to Fig. 3, it will be seen that my invention comprises in a moving picture machine, a source of light L, an objective lens O, a film F which moves between the source of light L and the objective lens, and a plurality of plane reflecting surfaces, preferably mirrors, here shown as two and designated M and M'. The two plane surfaces are oppositely arranged so that the light rays received by the surface M are reflected onto the surface M' and from it to a screen S. As is usual in moving picture machines, the film F moves in front of an opening in a plate P which is generally termed an "aperture plate," and in my invention the surface M (preferably mounted on a pivot) is moved in synchronism with each picture on the film F, while each picture is traveling past the opening in the aperture plate, while the second surface M' is in a fixed position relatively to the surface M.

After the picture on the film has passed beyond the opening in the plate P, the surface M is returned to its initial position ready to receive the light rays from the next succeeding picture on the film. This movement of the surface M is secured by means of cams surfaces $c'$, $c^2$, $c^3$, and $c^4$, and a roller $m$, carried by an arm $m'$ which is secured to the surface M. If desired a spring (not shown) may be used to always insure the roller $m$ traveling on the cam surfaces. The synchronous movement of the film and surface M is secured by means of suitably related gearing driven from a common driving shaft.

Still referring to Fig. 3, I have illustrated three successive positions of a picture Z in the opening of the aperture plate P, and its position on the surface M in each of its corresponding positions. It will be understood that the picture Z will have a multiplicity of positions in the opening of the aperture plate and that there will be a corresponding number of positions of the surface M, but for the purpose of explanation only three positions are shown.

With the picture in the position $Z'$, the surface M is in the position 1 and the roller $m$ will be on the cam surface $c'$ at about the beginning of the cam surface. When the picture reaches the position $Z^2$, surface M is in position 2, and the roller $m$ is on the cam surface $c'$ at the position shown. With the picture in the position $Z^3$, the surface M is in position 3, and the roller $m$ is at about the end of the cam surface $c'$ and adjacent the cam surface $c^2$. The three positions of the picture on the surface M in its three positions are also indicated by the reference characters $Z'$, $Z^2$, and $Z^3$. It will be seen, therefore, that the picture will travel upward on the surface M while it is traveling downward past the opening in the plate P. But it will also be noted that in each position of the picture on the surface M in each of its positions, the surface M will reflect the picture onto the surface M', at the same point. The surface M' therefore will always project the picture on the film along the same path notwithstanding that the picture or pictures are moving on the surface M.

Referring to Figs. 4, 5 and 6, it will be seen that my invention also contemplates the use, in a moving picture machine, of objective lenses of different focal distances and an initial adjustment of the position of the surfaces M. and M′ to correspond with the focal distance of the objective lens.

Fig. 4 shows an objective lens O, having a fixed focal distance from the aperture plate P. Fig. 5 shows an objective lens O having a second and different focal distance from the aperture plate P, and Fig. 6 shows an objective lens O having a third focal distance from the aperture plate P and which focal distance is different from that shown in Fig. 4 or Fig. 5. It will be seen from Figs. 4, 5 and 6 that with objective lenses O having different focal distances, the travel of the light rays from a picture on the surface M varies according to the objective lens used, and therefore to retain synchronous movement of the surface M with the film, the speed of movement of the surface M has to be taken care of. This may be accomplished by varying the length of the arm $m'$, which as here shown is accomplished by making the arm $m'$ in two telescoping pieces and providing a suitable device $m^2$ (see Fig. 1) to hold the two parts in their relative objected positions. It will also be seen that any change in the initial position of the surface M will require a corresponding change in the position of the surface M′, and this may be accomplished in any desired way, as by mounting the surface M′ on a pivot, and providing it with a pointer $m^4$ which travels over a suitable scale $m^5$. In carrying out this feature of my invention, the arm $m'$ is adjusted to move in synchronism with the film F with any given objective lens. After the length of the arm $m'$ has been fixed upon, the surface M′ is then placed in the required position so that it will always project the picture or pictures on the film along the same path notwithstanding the fact that the surface M has a multiplicity of positions between its extremes and that the picture or pictures are moving on the surface M.

Referring to Figs. 1 and 2, I have illustrated a moving picture machine showing a form that my invention may assume. The machine comprises a main framework for supporting several of the parts, and this framework is shown as comprising a base 1, an upright plate $1^a$, and end flanges $1^b$ and $1^c$. Suitably journaled in the plate $1^a$ is a shaft 2 which may be driven by a crank 3 or other form of motive device. The shaft 2 has fixed on it a gear 4. 5 designates a shaft also suitably journaled in the plate $1^a$ on which is fixed a wheel 6 and a gear 7 which meshed with the gear 4. The wheel 6 carries the cam surfaces $c'$, $c^2$, $c^3$ and $c^4$, and is also provided with a cam groove $c^5$, in which a roller $m$ travels. The film F, from any suitable source, passes under a tension roller 9, which is eccentric to its carrying shaft 10 suitably journaled in the plate $1^a$, and around a grooved and loose pulley 11 suitably journaled in the plate 1a and in front of an aperture in the plate P. A second grooved and loose roller 13 suitably journaled in the plate $1^a$ is located below the aperture plate P around which the film F passes to a sprocket 14. Coacting with the sprocket 14 is a second tension roller 15, which is like the roller 9 in its construction. The sprocket 14 and roller 15 are suitably journaled in an arm 16 which is loose on the shaft 2 and which arm 16 is moved about the shaft 2, by a lever handle 17 pivoted on the plate $1^a$ and having a pin $17^a$ which fits in a slot $16^a$ provided in the arm 16. The shaft of the sprocket 14 carries a gear 18 which meshes with and rides upon the gear 4. The arm 16 together with the sprocket 14, roller 15 and lever handle 17 provides what is known in the art as a "framing mechanism." By a manipulation of the lever handle 17, a picture on the film is caused to be properly positioned in the aperture of the plate P so that it can be "framed" on the screen. The film F is held against the aperture plate P by means of a pair of springs $18^a$ carried by a hinged front plate 19. The plate 19, with the tension springs $18^a$, is held in position by a latch 20, here shown as comprising a plate sliding on the plate 19 and engaging the notched end of a stud 21 carried by the end flange $1^b$.

Supported on the plate $1^a$ is a collar 22 in which is carried an objective lens O. The collar 22 is here shown as being adjustably mounted on the plate $1^a$ to accommodate objective lenses of different focal lengths, and to provide for their proper position relatively to the aperture plate P. The adjustment of the collar 22 is secured by means of screws 24, and screw threaded openings 25. A shoulder 26 is engaged by a shoulder 27 carried by the collar 22 to hold the collar in alinement. The objective lens O has a snug fit in the collar 22, but is capable of movement therein for the purpose of regulating the density of the light passing through the film so as to obtain a "sharp" picture.

Pivotally mounted in the plate $1^a$ is a frame 28 carrying a reflecting surface M, preferably a mirror. The frame 28 is made to rock on its pivot by the cam surface $c'$, $c^2$, etc., through the arm $m'$. The arm $m'$ is adjustable in its length, and this is accomplished by making it in two parts which telescope. A screw or other device $m^2$ is provided for fixing the two parts after any relative adjustment. A roller $m$ is provided on the arm $m'$ which travels in the cam groove $c^5$ so as to engage the cam surfaces $c'$, $c^2$, etc. By this arrangement the surface M is oscillated as the wheel 6 is driven, and the movement of the film F which is also driven at the same time as the wheel 6 is in synchronism with the movement of the surface M.

Opposite the surface M is a second surface M' also preferably a mirror, which is mounted in a frame 36 also pivotally mounted in the plate 1ª. Provision is made for rocking the surface M' on its pivot by means of the set screws 37 and 38 which are carried by the plate 1ª. A pointer $m^4$ carried by the frame 36 and working over a scale $m^5$, to indicate when the surface M' is in the correct position relatively to the surface M.

The wheel 6 as here shown is provided with four cam surfaces $c'$, $c^2$, $c^3$, $c^4$, each of which has a constant rise from a minimum to a maximum point. Consequently the surface M will be caused to move from one extreme position to another. The length of each cam surface is equal to the travel of one picture on the film from the top of the aperture plate to the bottom of the aperture plate, and consequently the light through such picture will always be onto the surface M.

What I claim as my invention and desire to secure by Letters Patent is:

1. In a moving picture machine, in combination; a source of light; a film carrying pictures; an objective lens; a reflecting surface to receive light rays from the film; means for causing a synchronous movement of the film and the reflecting surface; means for varying the speed of movement of the reflecting surface according to the focal distance of the objective lens; and a second reflecting surface opposite the first reflecting surface and fixed relatively thereto.

2. In a moving picture machine, in combination; a source of light; an objective lens; a film carrying pictures and movable between the source of light and the objective lens; means for continuously moving the film; a reflecting surface opposite the objective lens, whereby light rays of said picture will be thrown onto said surface; said surface being pivotally mounted to have a movement toward and away from the lens; means for causing periodic movements of the reflecting surface with the film comprising an adjustable connection whereby the movement of the surface may be regulated according to the focus of the objective lens; and a second reflecting surface fixed relatively opposite the first reflecting surface receiving light rays and reflecting the said light rays along the same path to a screen.

3. In a moving picture machine, in combination; a source of light; an objective lens; a film carrying pictures and movable between the source of light and the objective lens; means for continuously moving the film; a reflecting surface opposite the objective lens, whereby light rays of said picture will be thrown onto said surface; said surface being pivotally mounted to have a movement toward and away from the lens; means for causing periodic movements of the reflecting surface with the film comprising an adjustable connection whereby the movement of the surface may be regulated according to the focus of the objective lens; and a second reflecting surface opposite the first reflecting surface receiving light rays and reflecting the said light rays along the same path to a screen; said second reflecting surface being mounted to be capable of adjustment to correspond with the focal distance of the objective lens.

In witness whereof, I have signed my name to this application, in the presence of two subscribed witnesses.

CLARENCE L. TOMLINSON.

Witnesses:
M. S. KIRKLAND,
M. J. HAUS.